United States Patent Office 3,639,642
Patented Feb. 1, 1972

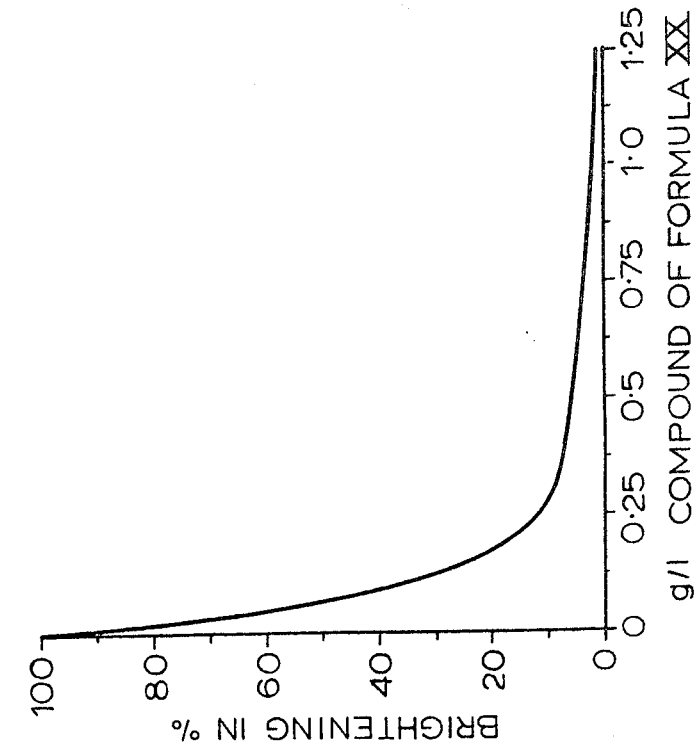

---

3,639,642
PROCESS FOR COUNTERACTING THE BRIGHTENING EFFECT DUE TO AN OPTICAL BRIGHTENER
Max Matter, Basel, Othmar Weidele, Aesch, Basel-Land, and Giuseppe Raspanti, Neuallschwil, Basel-Land, Switzerland, assignors to Sandoz Ltd., Basel, Switzerland
Filed Mar. 14, 1969, Ser. No. 807,320
Claims priority, application Switzerland, Mar. 30, 1968, 3,916/68; Aug. 30, 1968, 13,049/68
Int. Cl. D21d 3/00
U.S. Cl. 162—158                     10 Claims

ABSTRACT OF THE DISCLOSURE

The brightening effect produced by optical brighteners on organic substrates, particularly macromolecules of natural origin containing hydroxyl groups (such as natural or regenerated cellulose, especially in the form of paper, or textile fibres), is nullified by the incorporation in said substrates of an acid addition salt or quaternization product of a cyclic amidine or of a polycondensation product of such a cyclic amidine; the cyclic amidine itself has the Formula I

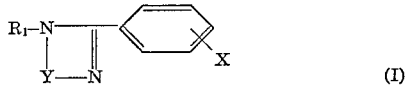

(I)

Figure 1:
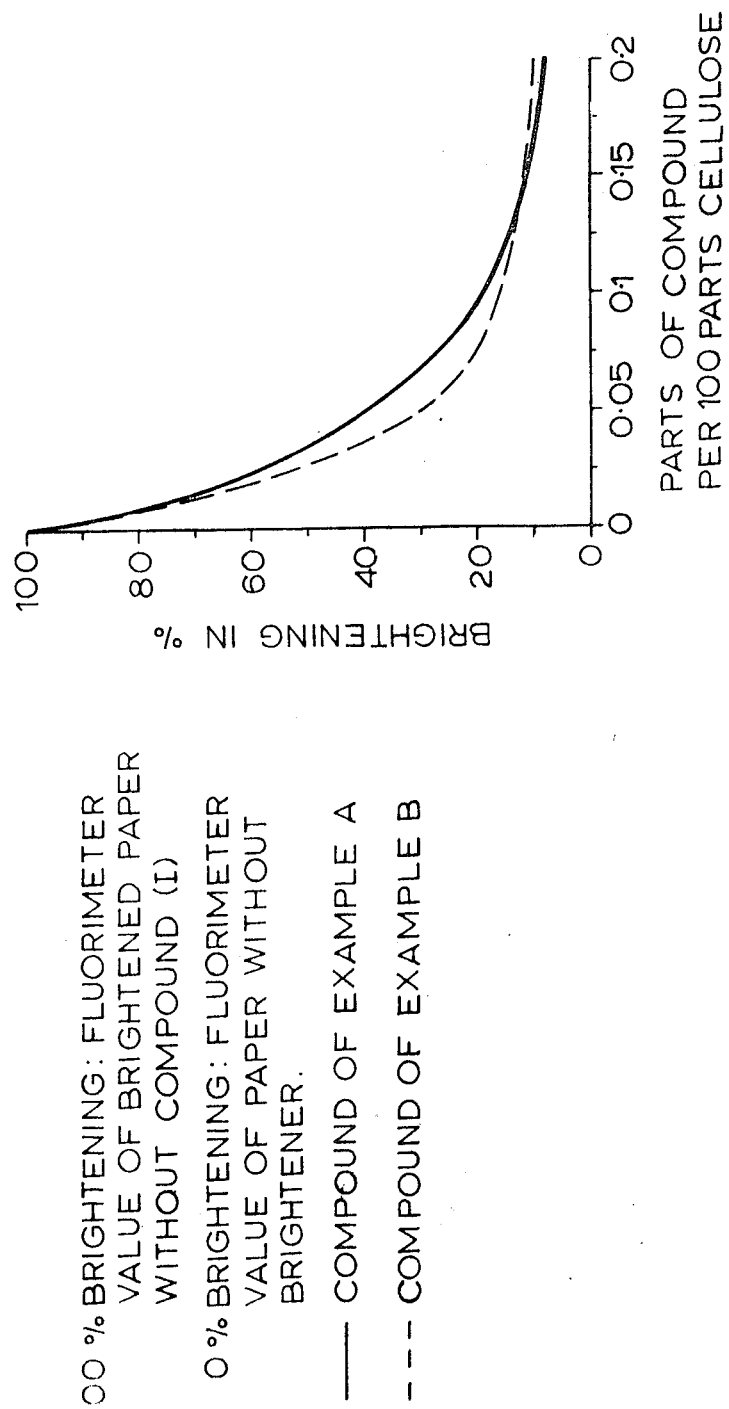

wherein:
Y is an alkylene chain with 2 to 4 carbon atoms between the two nitrogen atoms,
$R_1$ is hydrogen, alkyl, aryl or aralkyl with up to 7 carbon atoms and
X is hydrogen or a radical of the formula

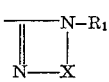

and the polycondensation product contains a plurality of units corresponding to the amidine of Formula I, though in that case the radical $R_1$ is an alkylene chain with up to 8 carbon atoms and the radical X is —CO—NH— and/or the divalent hereterocycle shown in Formula I.

---

The present invention relates to a process of treating materials to counteract or nullify the effect of optical brighteners.

Nowadays optical brighteners are frequently incorporated in substrates of organic origin, for example natural textile fibres and paper, so as to brighten the substrate. This brightening effect is not always desirable and there is thus a need for some means which will nullify the effect of the optical brightener. The nullifying of the effect (herein also referred to as "extinguishing") of optical brighteners is of practical importance, for example, in the paper industry. When optically brightened paper has been produced on a paper machine and this machine is then used for the production of paper which is not to be brightened, it is necessary to thoroughly clean the machine and the entire recirculating system associated therewith so as to remove residual amounts of optical brightener. This cleaning is extremely time consuming and reduces the production capacity of the plant. It is therefore much more rational to dispense with the removal of the last residues of optical brightener and to add to the paper which is not to be brightened, before or after paper sheet formation, compounds (herein also referred to as "extinguishers") which are able to nullify the brightening effect of optical brighteners. In this way the brightener entrained in the paper is made ineffective (i.e. "extinguished") and removal of residual brightener from the paper making plant becomes unnecessary. Such extinguishers can also be used in order to manufacture new paper which is not to be brightened, from waste paper which has been brightened.

The present invention provides a process for nullifying the brightening effect produced by optical brighteners on organic substrates, which process is characterized in that an acid addition salt or quaternization product of a cyclic amidine of the formula

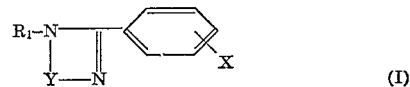

(I)

wherein:
Y is an alkylene chain having 2 to 4 carbon atoms between the two nitrogen atoms,
$R_1$ is selected from the group consisting of hydrogen, alkyl, aryl and aralkyl with up to 7 carbon atoms,
X is selected from the group consisting of hydrogen and a radical of the formula

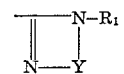

or of a polycondensation product containing a plurality of units corresponding to the compound of Formula I, in which case:
$R_1$ is an alkylene chain with up to 8 carbon atoms and X is selected from the group consisting of

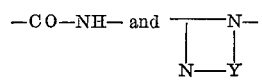

is incorporated in a substrate which has been optically brightened by an optical brightener, said salt or quaternization product being added in an amount sufficient to nullify the optical brightening effect.

Of the above mentioned organic substrates macromolecules of natural origin containing hydroxyl groups, for example macromolecules having a carbohydrate basis (natural cellulose in the form of textile fibres or of paper, regenerated cellulose, starch, etc.), and of synthetic origin, for example polyvinyl alcohol, are of especial importance. As optical brighteners of which the effect is to be nullified, there may be mentioned especially those which contain at least one sulphonic acid radical, for example, the optical brighteners of the stilbene series.

Some of the acid addition salts and quaternization products of compounds corresponding to the Formula I are known and some of them are new. The acid addition salts may be obtained by reacting the free cyclic amidines of Formula I with an inorganic acid, for example hydrochloric or hydrobromic acid, phosphoric acid, sulphuric acid, sulphurous acid or carbonic acid, or an organic acid, for example an aliphatic or aromatic mono- or poly-carboxylic acid (e.g. formic acid, acetic acid, propionic acid, lauric acid, oleic acid, stearic acid, lactic acid, oxalic acid, adipic acid, tartaric acid, citric acid, gluconic acid, benzoic acid, or a nuclear substitution derivative thereof) or an aliphatic or aromatic sulphonic acid (e.g. methanesulphonic or ethanesulphonic acid, an alkanesulphonic acid with 3 to 20 carbon atoms, benzene-, methylbenzene- or naphthalenesulphonic acids) or an alkylsulphuric acid with, e.g., from 1 to 20 carbon atoms; preferred acids are acetic acid, benzenesulphonic acid, 4-methylbenzenesulphonic acid, sulphuric acid or hydrochloric acid.

It is possible to produce the acid addition salt of the above Compound I or of a corresponding polymer before applying it and then to apply it directly to the substrate containing the optical brightener; alternatively the free base may be applied and a salt formed by subsequent treatment with an acid material on the substrate. The last mentioned method of carrying out the invention may be effected, for example, by treating the substrate first with the free base and then exposing the resulting treated substrate to the action of an acid, or to a carbon dioxide or sulphur dioxide containing atmosphere.

Since the above quaternization products are salts of strong bases, they are practically completely ionized at all pH values. The quaternization products may be suitably produced by reacting a compound of the Formula I or a corresponding polymer with, for example, an alkyl-, cycloalkyl- or aralkyl halide (preferably the chloride, bromide, or iodide), with the corresponding mono- or diester of sulphuric acid and the corresponding alkane- benzene- or toluene-sulphonic acid ester, or with an epoxide, for example ethylene oxide or propylene oxide. In the last mentioned case it is advantageous to start with a salt of a compound of the Formula I or to neutralize the quaternary base after reaction; the same acids as for the production of the addition salt of the compound of the Formula I are suitable for this purpose. Suitable quaternization agents are, for example, butyl bromide, dodecyl bromide, fatty alkyl bromides, ethyl iodide, octadecyl chloride, benzyl chloride, chloroacetamide, dimethyl sulphate, diethyl sulphate, sodium butyl sulphate, or benzene-sulphonic acid or toluene-sulphonic acid methyl- or -ethyl ester.

When a bifunctional quaternization agent is used which may react twice with a compound of the Formula I, for example 1,2-dichloro- or 1,2-dibromoethane, 1,3-dichloro- or 1,3-dibromopropane, 1,4-dichloro- or 1,4-dibromobutane, 1-bromo-3-chloropropane, 1,3 - dichloro-2-propanol, 3-chloro-1,2-epoxypropane, 1,2 - bis - (toluenesulphonyloxy)-ethane, two molecules of the compound of the Formula I are linked to one another via the hydrocarbon residue of the quaternization agent.

The production of five-membered ring compounds (2-arylene-1,3-diaza-2-cyclopentenes or 2-arylene-2-imidazolines) is described, for example, in the book "Chemistry of Carbon Compounds" by E. M. Rodd, volume IV; part A; pages 301–306 (1957), published by Elsevier Publishing Co., Amsterdam, or in the Article by R. J. Ferm and J. L. Riebsomer, Chemical Reviews 54, pages 593–606 (1954) and in the U.S. Pat. No. 2,914,427.

The six-membered ring compounds (2-arylene - 1,3-diaza-2-cyclohexenes or 2 - arylene - 3,4,5,6 - tetrahydropyrimidines) and the seven-membered ring compounds (2-arylene-1,3-diaza-2-cycloheptenes) may be produced according to the process of Oxley and Short, Journal of the Chemical Society, London, 1947, page 499.

For the production of extinguished paper from brightened waste paper it is especially important that the extinguisher, on adding it to aqueous cellulose fibre suspensions, should be absorbed by the fibres quickly and that it should not remain in the water on sheet formation; when the extinguisher used has this property the extinguishing effect is especially pronounced. Many salts or quaternization products of the polymeric cyclic amidines of the Formula I have this property. For example, from a mixture of terephthalic acid, bis-(2-aminoethyl)-amine and bis-(3-aminopropyl)-amine a polymer results which is composed of units of the following formula

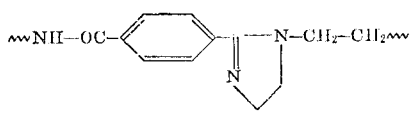

(II)

and

(III)

With a mixture of isophthalic acid, diethylene triamine and triethylene tetramine a polymer results which contains units of the following formula

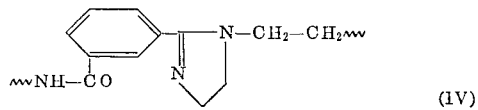

(IV)

and

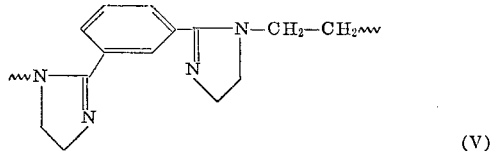

(V)

By the addition of an acid the acid addition salt of the heterocyclics with units of the Formulae II to V result. For example, with lactic acid the lactates are obtained and with hydrochloric acid the hydrochlorides. With alkylation agents, for example with dimethyl sulphate or benzyl chloride, N - methylimidazolinium - methosulphates, N-methyl - tetrahydropyrimidinium - methosulphates, N-benzyl-imidazolinium-chlorides and N-benzyl-tetrahydropyrimidinium-chlorides result.

In cases where it is not necessary that the extinguisher should be quickly absorbed by the fibre from a dilute fibre suspension, for example when the paper is coated, it is possible simply to distribute the extinguisher in the coating mass, for example in starch, and thus to incorporate it in the paper surface through the coating operation. For this method of working there is eminently suitable, for example, the bishydrochloride of 1,4-di-(imidazolin-2-yl)-benzene of the formula

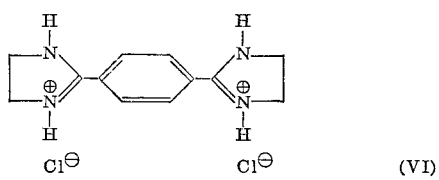

(VI)

or another salt of said benzene derivative.

It is likewise possible to use the following substances as salts, especially low molecular weight carboxylates, e.g. the formates or acetates:

Imidazolin-2-yl-benzene, 1,4,5,6-tetrahydropyrimidin-2-yl-benzene, 1,3-di-(imidazolin-2-yl)-benzene, and 1,4-di-(1-benzyl-imidazolin-2-yl)-benzene. Fully quaternized, e.g. alkylated, cyclic amidines can also be used as extinguishers, for example p-phenylene-di-(1-benzyl-3-methyl-2-imidazolinium-methosulphate) of the formula

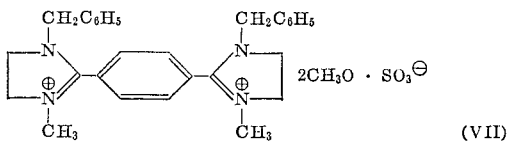

(VII)

or another fully quaternized, especially alkylated, derivative of said imidazoline compounds.

The use of the salts or quaternization products of compounds of the Formula I has several marked advantages over the use of known extinguishers; for example, the former are stable towards light and autodecomposition in dilute and concentrated solutions, for example in water. Paper which has been treated in accordance with the invention may be used as raw material for the manufacture of new, optically brightened paper.

In the following Examples A to M there is described the production of a few new and known compounds in accordance with the present invention and in Examples 1 to 3 the application of a few of the compounds to be used in accordance with the invention.

Parts and percentages are by weight; temperatures are stated in degrees centigrade. It should be noted that the Formulae VII, X, XI, XII, XII correspond to recurring units as is indicated by the squiggly lines at each end of each of said formulae.

As used herein, the terms "condensation product" and "polymer," as applied to the material having recurring units of the Formula I, are used synonymously.

PRODUCTION EXAMPLES.—EXAMPLE A 98.01 parts (0.95 mol) bis-(2-aminoethyl)-amine, 13.12 parts (0.10 mol) bis-(3-aminopropyl)-amine and 446.46 parts 1,2-propanediol are mixed at room temperature and 194.18 parts (1.00 mol) terephthalic acid dimethyl ester are added while stirring. The mixture is heated under nitrogen to 180° during the course of a few hours. During this time the methanol produced by the reaction is distilled off (64.05 parts=2.0 mol). 223.23 parts 1,2-propanediol and 18 parts (1.0 mol) of reaction water (totalling 241.23 parts) are distilled off during a further ten hours at 185–190°. After cooling to 70°, 72.06 parts (1.2 mol) acetic acid are added at 70 to 80° while cooling slightly. The mixture is stirred during ten minutes and diluted with 225.58 parts of water. After cooling, 744.1 parts of a light yellow, slightly viscous solution of the acetate of a mixture of polymeric bases is obtained containing groupings of the Formulae II and III. The active material content of the solution (calculated as free base) amounts to about 30%.

EXAMPLE B 153.55 parts (1.05 mol) N,N′ - bis - (2-aminoethyl)-ethylene-diamine and 495.36 parts 1,2-propanediol are mixed at room temperature and 194.18 parts (1.00 mol) of terephthalic acid dimethyl ester are added while stirring. Subsequently the mixture is heated under nitrogen during the course of a few hours to 180°. During this time methanol produced by the reaction is distilled off (64.05 parts=2.0 mol). 247.68 parts of 1,2-propanediol and 36 parts (2.0 mol) of reaction water (totalling 283.68 parts) are distilled off during a further ten hours at 185–190°. After cooling to 70°, 120.1 parts (2.0 mol) acetic acid and 71.26 parts (0.4 mol) gluconolactone are added at 70–80° while slightly cooling. Further stirring is effected during ten minutes, dilution is effected with 138.88 parts water and, after cooling, there are obtained 825.60 parts of a reddish, slightly viscous solution of a mixture of organic salts of which the anions consist of acetate and gluconate ions; the cations are polymeric imidazolinium ions and mainly contain groupings of the following formula

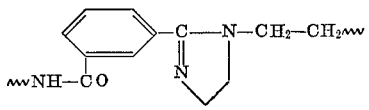

(VIII)

The active material content of the solution (calculated as free base) amounts to about 30%.

EXAMPLE C

A mixture of 3.9 parts (0.03 mol) 1,4-dicyanobenzene, 14.9 parts (0.03 mol) N-benzylethylenediamine-bis-p-toluene-sulphonate and 4.5 parts (0.03 mol) N-benzyl-ethylenediamine is heated while stirring in a stream of nitrogen to 200° for six hours. After a short time a clear melt results. Evolving ammonia corresponds to about 90% of theory. On cooling, the melt solidifies to a glassy, brown coloured mass. Crude yield: 21.5 parts=97% of theory. After pulverization, the product is recrystallized from water, whereby decolouring with activated charcoal is effected. 12.2 parts (55% of theory) of pure 1,4-di-(1-benzyl-imidazolin-2-yl)-benzene as bis-p-toluene-sulphonate of the formula

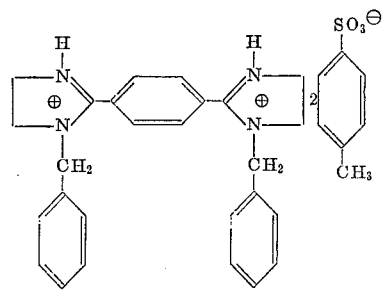

(IX)

in the form of colourless crystals melting at 220–221° are obtained. The active material content of the compound (calculated as free base) amounts to about 53%.

EXAMPLE D 166.13 parts (1.0 mol) iso-phthalic acid are run into 103.17 parts (1.0 mol) diethylenetriamine and 50 parts water at 30–90° while stirring, whereby exothermic reaction takes place. Heating for three hours at 185–190° is effected in an atmosphere of nitrogen. During this time the added water and that which is produced by the reaction are distilled off through a column. Condensation is further effected at 190–200° during two hours and 30 mm. of Hg. After the addition of 100 parts triethyleneglycol further condensation is effected at 190–200° and 40–50 mm. of Hg during fourteen hours. After breaking the vacuum by introducing nitrogen, the reaction mixture is slowly diluted at 180° with 115 parts of dry triethyleneglycol. After cooling, a viscous, brown solution is obtained which contains about 50% of a crude poly-imidazoline derivative of the formula

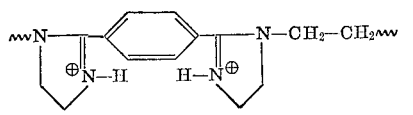

(X)

EXAMPLE E 43.5 parts (0.1 equivalent) of the poly-imidazoline derivative solution described in Example D is stirred with 27.4 parts (0.2 mol) butyl bromide during fifteen hours at 80–90°. The excess of butyl bromide is subsequently distilled off in a vacuum.

After cooling, a clear brown, viscous solution is obtained which contains 62% of alkylated product in triethyleneglycol. The new compound is well soluble in water and corresponds to the following formula

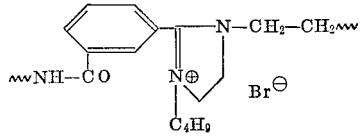

(XI)

EXAMPLE F 43.5 parts (0.1 equivalent) of the poly-imidazoline derivative solution described in Example D is stirred with 8.4 parts (0.09 mol) of chloroacetamide during three hours at 105–110°. Subsequently the mixture is diluted with 8.4 parts water. After cooling, a light brown, viscous solution is obtained which contains 50% of alkylated product in triethyleneglycol and water.

The new compound is well soluble in water and corresponds to the following formula

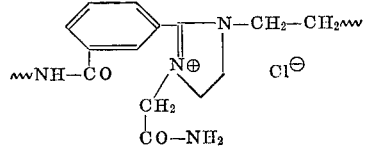

(XII)

EXAMPLE G 43.5 parts (0.1 equivalent) of the poly-imidazoline derivative solution described in Example D are stirred with 26.1 parts (0.09 mol) 1-chloro-octadecane during five hours at 150–165°. After cooling, a light brown, wax-like substance is obtained which contains about 70% of alkylated product in triethyleneglycol.

The new compound is soluble in water with slight turbidity and corresponds to the following formula

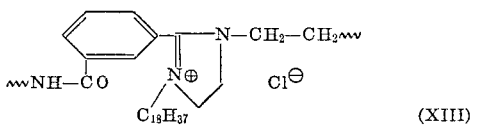

(XIII)

EXAMPLE H

A mixture of:

6.81 parts (0.016 mol) 1,3-diaminopropane-di-p-toluene-sulphonate,
1.11 parts (0.015 mol) 1,3-diaminopropane and
1.54 parts (0.012 mol) 1,4-dicyanobenzene is heated while stirring in a stream of nitrgoen to 240°. The resulting melt is allowed to react fifteen hours at 240°. During this time ammonia in an amount of 95% of theory is split off. After cooling, the product is recrystallized twice from ethanol.

Analytically pure 1,4-di-(tetrahydropyrimid-2-yl)-benzene-bis-p-toluene-sulphonate in the form of white crystals is obtained which melts at 252–254° and corresponds to the formula

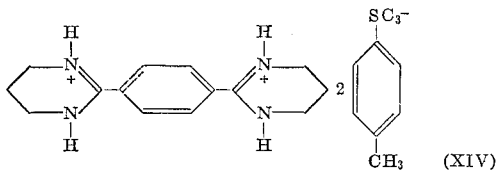

(XIV)

EXAMPLE J

A mixture of:

6.48 parts (0.015 mol) 1,4-diaminobutane-di-p-toluene-sulphonate,
1.32 parts (0.015 mol) 1,4-diaminobutane and
1.92 parts (0.015 mol) 1,4-dicyanobenzene is heated while stirring in a stream of nitrogen to 200°. The resulting melt is allowed to react for fifteen hours at 200°. During this time ammonia is split off in an amount of 95% of theory. By recrystallizing the reaction product from ethanol analytically pure 1,4-di-(1,3-diazacyclohepten-2-yl)-benzene-bis-p-toluene-sulphonate is obtained in the form of a white, crystalline substance melting at 259–261° of the formula

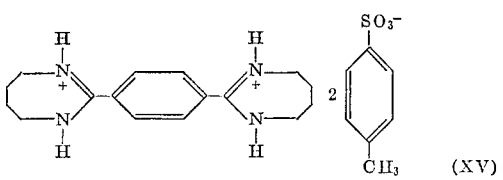

(XV)

EXAMPLE K

A mixture of:

3.2 parts (0.025 mol) 1,4-dicyanobenzene,
12.0 parts (0.025 mol) N-phenylethylenediamine-bis-p-toluene-sulphonate and
3.4 parts (0.025 mol) N-phenylethylenediamine is heated while stirring in a stream of nitrogen to 210° for 24 hours.

After a short time a clear melt results. Ammonia which evolves, corresponds to about 90% of theory. On cooling, the melt solidifies to a brown coloured mass. After pulverization, the product is recrystallized twice from water, decolorization with activated charcoal being effected. Analytically pure 1,4-di-(1-phenyl-imidazolin-2-yl)-benzene as bis-p-toluene-sulphonate of the formula

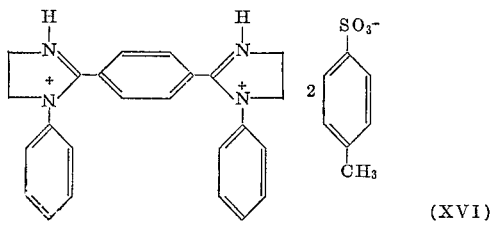

(XVI)

in the form of colourless crystals melting at 258–260° is obtained.

EXAMPLE L

A mixture of:

69.6 parts (0.6 mol) N-butylethylenediamine,
38.8 parts (0.2 mol) terephthalic acid dimethyl ester and
50 parts 1,2-propanediol is heated while stirring under a current of nitrogen during the course of a few hours at 180–190°. During this time methanol and water produced by the reaction are distilled off.

The excess of N-butylethylenediamine and 1,2-propanediol are subsequently distilled off in a vacuum. After cooling, the residual product is recrystallized twice from diethyl ether. Analytically pure 1,4-di-(1-butyl-imidazolin-2-yl)-benzene is obtained in the form of a white, crystalline substance melting at 76–78° of the formula

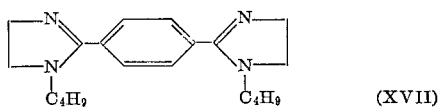

(XVII)

EXAMPLE M

A solution of 4.9 parts (0.015 mol) of 1,4-di-(1-butyl-imidazolin-2-yl)-benzene described in Example L in 20 parts acetonitrile is stirred with 4.56 parts (0.036 mol) benzyl chloride during ten hours at 80–90°. During this time a white product precipitates. After filtration, the product is recrystallized twice from isopropyl alcohol-dioxane. Analytically pure 1,4-di-(1-butyl-3-benzyl-2-imidazolinium)-benzene dichloride is obtained in the form of a white, crystalline, water soluble substance of the formula

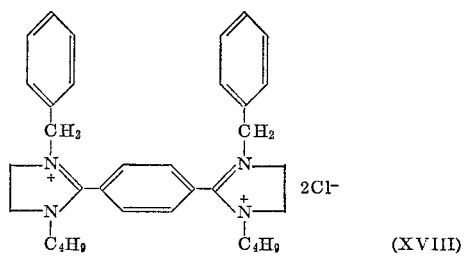

(XVIII)

EXAMPLES OF USE.—EXAMPLE 1

In each case, 5000 parts of a paper pulp of bleached sulphite cellulose having a grinding degree of 40° Schopper-Riegler and a dry substance content of 2% (corresponding to 100 parts of sulphite cellulose) are mixed while stirring with 3 parts of crystalline aluminum sulphate and after a few minutes with a solution of 0.06 part of the optical brightener of the formula

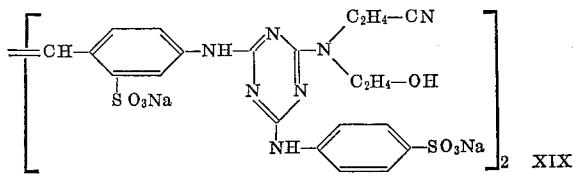

in 100 parts of water. After fifteen minutes 2 parts of a resin suspension are added. After thorough mixing, 100 parts of a solution containing the extinguisher produced according to the data of Example A or B are added, stirring is continued for one minute, dilution to 20,000 parts and the paper sheet is formed.

In a series of tests the amount of the extinguisher added is changed so as to determine the relationship between reduction of brightening (extinction effect) and the amount of extinguisher, by measuring the fluorescence of the dried sheets with a fluorimeter. The determination of the results obtained is effected by visual evaluation in daylight. The diminution of the brightening effect obtained by the extinguishers produced according to the data of Examples A and B is determined according to the above method and is illustrated in the graphic representation shown in FIG. 1 of the accompanying diagrammatic drawings.

Results of the same value are obtained when one uses extinguishers produced according to the data of Example D, E, F or G.

EXAMPLE 2

Instead of extinguishing the paper in the mass as in Example 1, it is possible to apply the extinguisher to be used in accordance with the invention in a sizing press or another coating device. In the laboratory the extinction effect obtainable by means of this process can be demonstrated as follows.

Dry paper is padded in a liquor containing per litre 80 g. of starch and 0.6 g. of the optical brightener of the Formula XIX, squeezing being effected to a liquor take-up of 100%. The resulting brightened paper is dried and then padded in a liquor containing an extinguisher of the formula

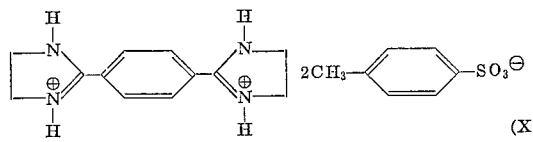

and squeezed to a liquor uptake of 100%. By altering the amount of the extinguisher used in the various samples it is possible to determine the relation between reduction of the brightening and the amount of the extinguisher, as described in Example 1. The reduction of brightening achieved by the extinguisher of the Formula XX may be seen from the graphic representation shown in FIG. 2 of the drawings.

EXAMPLE 3

A fabric of cotton or viscose rayon which has been treated with 0.2% of a brightener of the formula

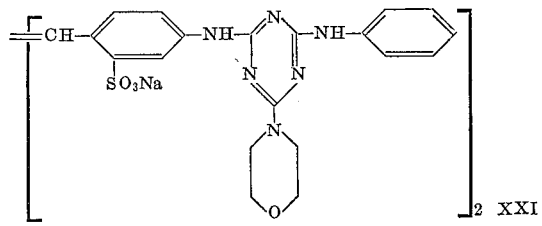

is dabbed with the compounds described in Examples A to M in the form of 1% aqueous solutions acidified with formic acid. The intensive optical brightening of the fabric is nullified at the places which had been dabbed which may be easily ascertained in daylight. In ultraviolet light the dabbed places appear as black spots on a light surface.

The above dabbing test can similarly be carried out with an unsized paper which had been treated with 0.2% of a brightener of the formula

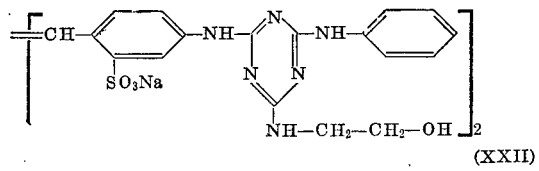

EXAMPLE 4

In a Fourdrinier machine paper is produced with a weight of 80 g./m.$^2$, using brightened waste paper as raw material.

In order to extinguish the optical brightener contained therein, the paper is sprayed in the second half of the paper sieve with a dilute aqueous solution of the compounds described in Example A or B in such a way that the dry paper contains 0.1 to 0.5% (depending on the concentration of the brightener in the raw material) of extinguisher.

The paper manufactured in this way corresponds as regards the optical properties to a quality of paper which does not contain any optical brightener.

Although the present invention is described herein with particular reference to specific details, it is not intended that such details shall be regarded as limitations upon the scope of the invention except insofar as included in the accompanying claims.

We claim:
1. A process for nullifying the brightening effect produced by optical brighteners on organic substrates, which process is characterized in that an acid addition salt or quaternization product of a cyclic amidine of the formula

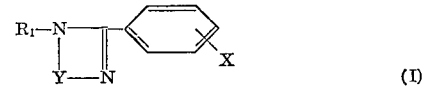

wherein
Y is an alkylene chain having 2 to 4 carbon atoms between the two nitrogen atoms,
$R_1$ is selected from the group consisting of hydrogen, alkyl, aryl and aralkyl with up to 7 carbon atoms,
X is selected from the group consisting of hydrogen and a radical of the formula

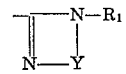

or of a polycondensation product containing a plurality of units corresponding to the compound of Formula I, in which case
$R_1$ is an alkylene chain with up to 8 carbon atoms and
X is selected from the group consisting of

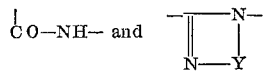

is incorporated in an organic substrate containing hydroxyl-groups which has been optically brightened by an optical brightener, said salt or quaternization product being added in an amount sufficient to nullify the optical brightening effect.

2. A process according to claim 1, in which the cyclic amidine is of the formula

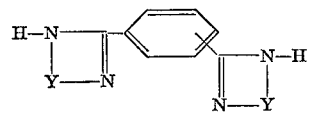

wherein Y has the above significance.

3. A process according to claim 1, in which the cyclic amidine is of the formula

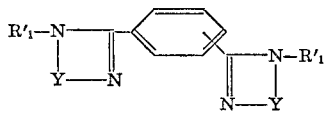

wherein
Y has the above significance and
R′₁ is selected from the group consisting of alkyl, aryl or aralkyl having not more than 7 carbon atoms.

4. A process according to claim 1, in which the polycondensation product is composed of recurring units of the formula

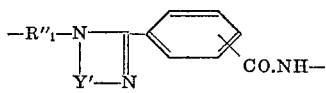

wherein Y′ and R″₁ are selected from the group consisting of ethylene, 1,2-propylene and 1,3-propylene.

5. A process according to claim 1, in which the polycondensation product is composed of recurring units of the formula

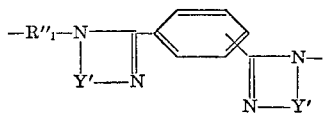

wherein Y′ and R″₁ are as defined in claim 4.

6. A process according to claim 1, in which the material added to nullify the optical brightening effect is an acid addition salt corresponding to the formula

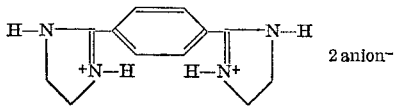

7. A process according to claim 1, in which the material added to nullify the optical brightening effect is an acid addition salt corresponding to the formula

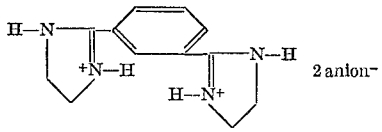

8. A process according to claim 1, in which the material added to nullify the optical brightening effect is a polymeric compound containing in the molecule a recurring unit of the formula

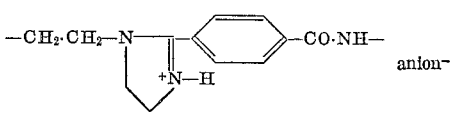

9. A process according to claim 1, in which the material added to nullify the optical brightening effect is a polymeric compound containing in the molecule a recurring unit of the formula

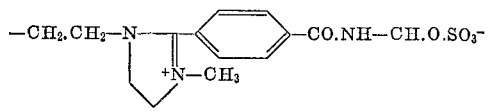

10. A process according to claim 1, in which the material added to nullify the optical brightening effect is a polymeric compound containing in the molecule a recurring unit of the formula

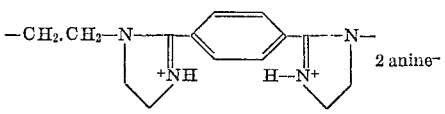

References Cited

UNITED STATES PATENTS 3,542,642  11/1970  Speese _____ 162—158
2,914,427  11/1959  Valko _____ 117—139.5

FOREIGN PATENTS 513,918  6/1962  Great Britain.

OTHER REFERENCES

Ferm and Riebsomer, Chemical Reviews 54, 593–606; Oxley and Short, Journal of the Chemical Society, London, 1947, 499.

S. LEON BASHORE, Primary Examiner

R. H. ANDERSON, Assistant Examiner

U.S. Cl. X.R.

117 — 144.5;  162 — 162;  260 — 239 B, 240 B, 251 R, 256.4 H, 309.6